July 13, 1943.   I. C. REYNOLDS   2,324,323
PIPE COUPLING CUTTER
Filed Oct. 14, 1942   3 Sheets-Sheet 3
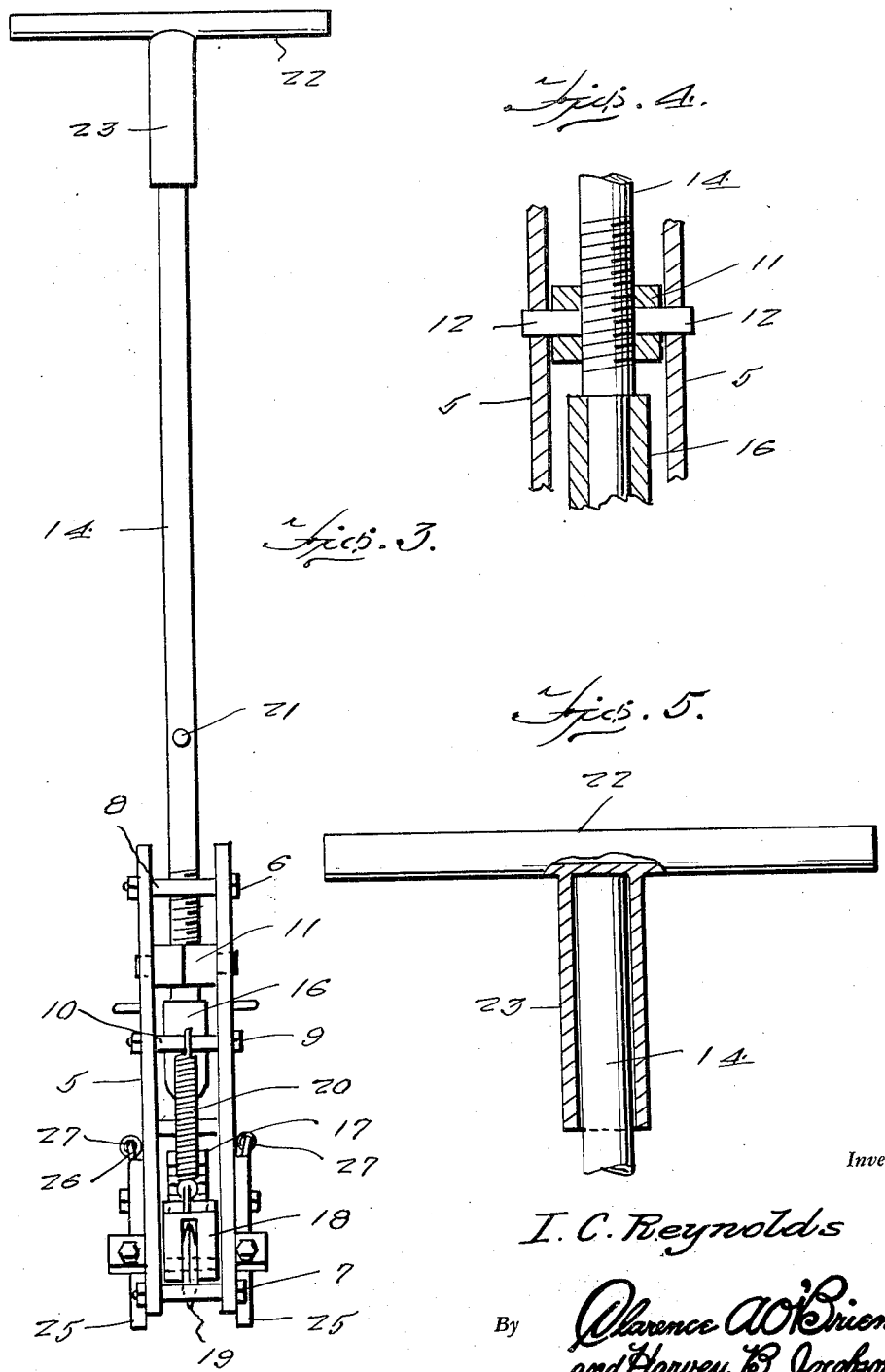
Inventor
I. C. Reynolds
By Clarence A. O'Brien
and Harvey B. Jacobson
Attorneys Patented July 13, 1943

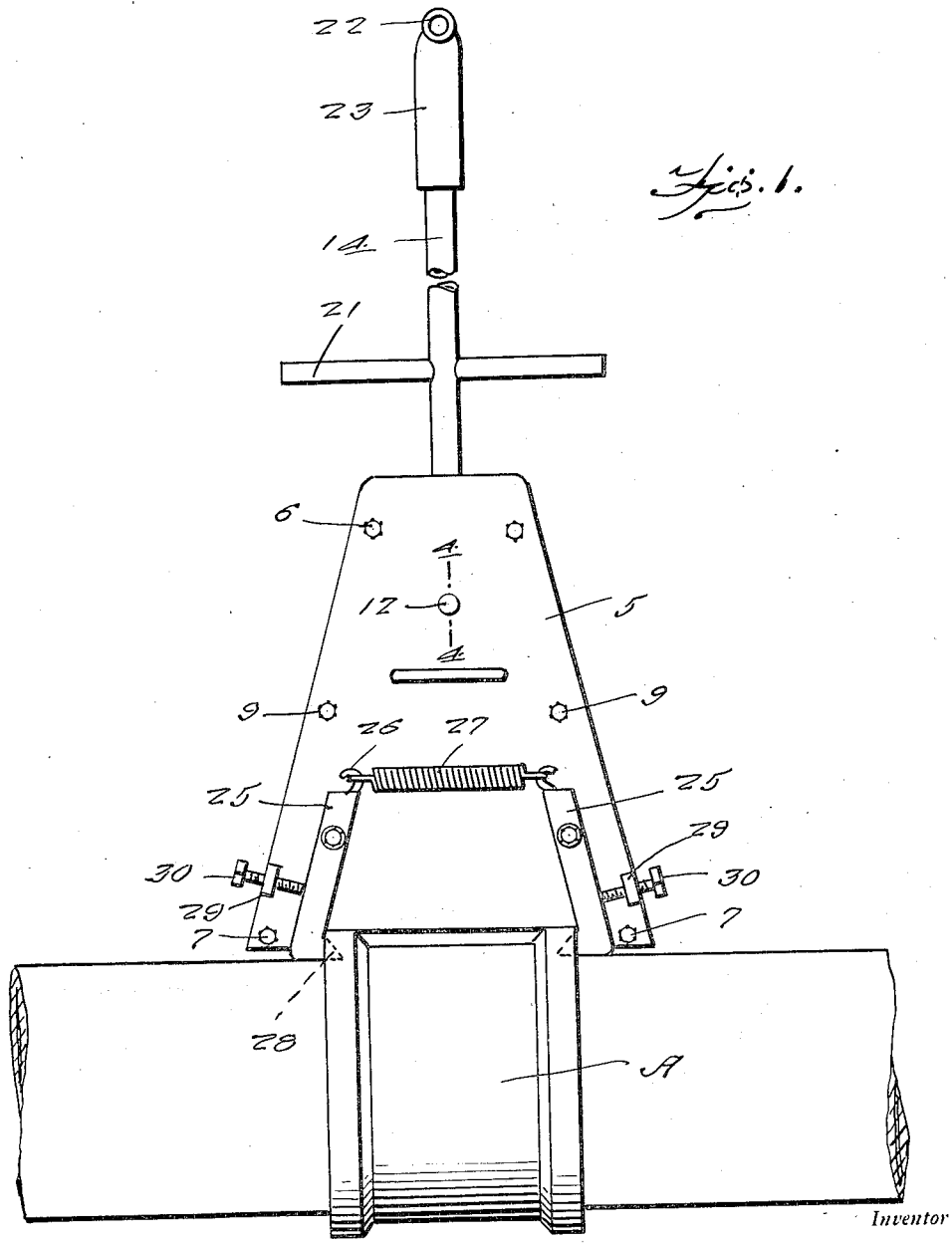

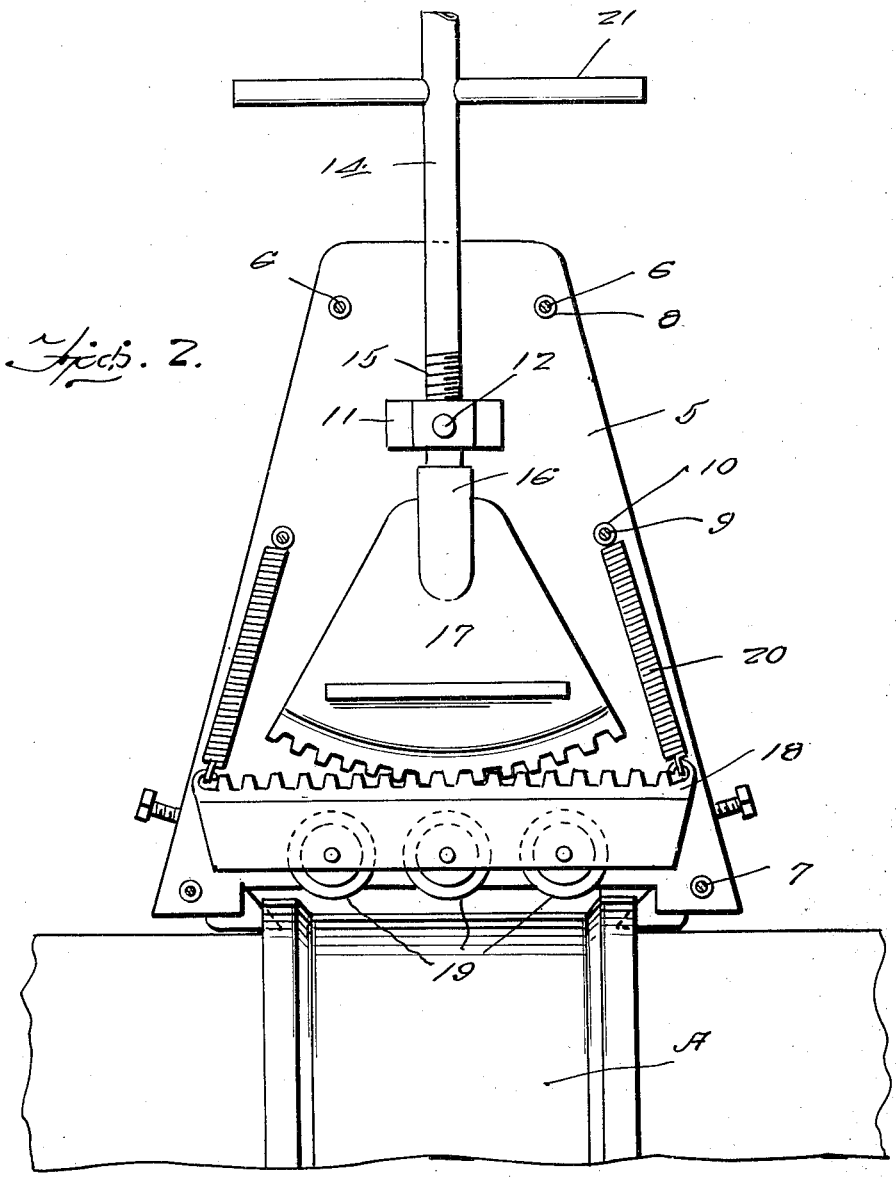

2,324,323

UNITED STATES PATENT OFFICE 2,324,323

PIPE COUPLING CUTTER

Irenius C. Reynolds, Oak Grove, La.

Application October 14, 1942, Serial No. 462,038

7 Claims. (Cl. 30—92)

This invention relates to new and useful improvements in cutters and more particularly to a cutter for cutting pipe couplings.

The principal object of the present invention is to provide a cutter which can be used for quickly cutting couplings to the end that pipe ends may be quickly separated.

Another important object of the invention is to provide a cutter of the character stated which is quick-acting, positive acting and of extremely simple construction.

Other objects and advantages of the invention will become apparent to the reader of the following description.

In the drawings:

Figure 1 represents a side elevational view of the tool applied to a pipe coupling.

Figure 2 is a vertical sectional view through the tool.

Figure 3 is an edge elevational view.

Figure 4 is a fragmentary detailed sectional vew taken substantially on the line 4—4 of Figure 1.

Figure 5 is a fragmentary detailed sectional view showing the handle.

Referring to the drawings wherein like numerals designate like parts, it can be seen that the tool includes a pair of oppositely tapering side walls 5, 5 which are held in close spaced relation by upper and lower tie bolts 6, 6 and 7, 7 passing through spacer sleeves 8. Intermediate bolts 9 are provided for the same purpose and have spacer sleeves 10.

A nut 11 is interposed between the plates 5, 5 and has trunnions 12 which fit into openings in the side walls 5, 5, thus rockably supporting the nut.

Numeral 14 denotes an elongated shaft threaded as at 15 at its lower end and disposed through the nut 11. The lower end of the shaft 14 is swivelly connected to an enlarged portion 16 at the upper portion of a segmental gear 17, which gear meshes with a rack 18 carrying a plurality of disk cutters 19. Tension springs 20, 20 are interposed between the ends of the rack 18 and the sleeves 10 on the bolts 9.

Handle bars 21 are provided on the shaft 14 adjacent to the walls 5, 5, while at the upper end of the shaft 14 is a cross handle 22 having a depending sleeve 23 which can fit over the upper end of the shaft 14.

On the outer side of each side wall 5 are rockable leg members 25, 25 the upper ends of which have hook members 26 thereon connected by a tension spring 27. The lower ends of the legs 25, 25 are provided with spurs 28 which engage under the flanged ends of a pipe coupling A when the tool is to be affixed.

On the outer side of each side wall 5 are lugs 29, 29 through which adjusting screws 30 are disposed, these screws being adapted to urge the lower ends of the leg members 25 into proper snug engagement with the flanged ends of the coupling 8.

Obviously, in operation of this tool, the shaft 14 is rotated by the hand bars 21 until the cutters 19 are properly bearing against the coupling A. The shaft 14 can now be oscillated on the trunnions 12 of the nut 11 in order to effect a cutting action of the blades 19. As cuts are made in the coupling A, the shaft 14 can be screwed down to add pressure to the cutting blades 19.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A pipe cutter comprising a frame, a reciprocatory cutter, a rockable member for actuating the cutter, and hand means for actuating the rockable member.

2. A pipe cutter comprising a frame, a reciprocatory cutter, a rockable member for actuating the cutter, and hand means for actuating the rockable member, said rockable member and hand means comprising an elongated shaft having a handle, a nut, said shaft being threadedly disposed through the nut, said nut being rockably supported, and gear teeth between the reciprocatory cutter and the rockable member.

3. A pipe cutter comprising a frame, a reciprocatory cutter, a rockable member for actuating the cutter, and hand means for actuating the rockable member, said rockable member and hand means comprising an elongated shaft having a handle, a nut, said shaft being threadedly disposed through the nut, said nut being rockably supported, and gear teeth between the reciprocatory cutter and the rockable member, and spring means for holding the reciprocatory cutter against the rockable member.

4. A pipe cutter comprising a frame, a reciprocatory cutter, a rockable member for actuating the cutter, and hand means for actuating the rockable member, said rockable member and hand means comprising an elongated shaft having a handle, a nut, said shaft being threadedly disposed through the nut, said nut being rockably supported, and gear teeth between the reciprocatory cutter and the rockable member, and spring means for holding the reciprocatory cutter against the rockable member, and pipe coupling engageable detent means for the frame.

5. A pipe cutter comprising a frame, a reciprocatory cutter, a rockable member for actuating the cutter, and hand means for actuating the rockable member, said rockable member and hand means comprising an elongated shaft having a handle, a nut, said shaft being threadedly disposed through the nut, said nut being rockably supported, and gear teeth between the reciprocatory cutter and the rockable member, and spring means for holding the reciprocatory cutter against the rockable member, and pipe coupling engageable detent means for the frame, said detent means being in the form of swingable leg members having foot portions for engagement under the flanged ends of a coupling.

6. A pipe cutter comprising a frame, a reciprocatory cutter, a rockable member for actuating the cutter, and hand means for actuating the rockable member, said rockable member and hand means comprising an elongated shaft having a handle, a nut, said shaft being threadedly disposed through the nut, said nut being rockably supported, and gear teeth between the reciprocatory cutter and the rockable member, and spring means for holding the reciprocatory cutter against the rockable member, and pipe coupling engageable detent means for the frame, said detent means being in the form of swingable leg members having foot portions for engagement under the flanged ends of a coupling, and spring means for separating the said ends of the leg members.

7. A pipe cutter comprising a frame, a reciprocatory cutter, a rockable member for actuating the cutter, and hand means for actuating the rockable member, said rockable member and hand means comprising an elongated shaft having a handle, a nut, said shaft being threadedly disposed through the nut, said nut being rockably supported, and gear teeth between the reciprocatory cutter and the rockable member, and spring means for holding the reciprocatory cutter against the rockable member, and pipe coupling engageable detent means for the frame, said detent means being in the form of swingable leg members having foot portions for engagement under the flanged ends of a coupling, and spring means for separating the said ends of the leg members, and third members for urging the leg members against a coupling.

I. C. REYNOLDS.